US008843851B1

(12) United States Patent
Gotchy et al.

(10) Patent No.: US 8,843,851 B1
(45) Date of Patent: Sep. 23, 2014

(54) PROACTIVE CHAT SUPPORT

(75) Inventors: Matthew B. Gotchy, Reno, NV (US); Jason Alexander Poteet, Lodi, CA (US); Anne Quinter Smith, Redwood City, CA (US); Michael Anthony Panian, Mountain View, CA (US); Zachery Moneypenny, Madison, WI (US); Alexandr Tolchinsky, Santa Clara, CA (US); Rajasivasubramanian Ramanathan, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 269 days.

(21) Appl. No.: 13/193,425

(22) Filed: Jul. 28, 2011

(51) Int. Cl.
*G06F 3/048* (2013.01)

(52) U.S. Cl.
USPC ........... 715/819; 715/708; 715/709; 715/710; 715/714; 715/829

(58) Field of Classification Search
CPC .................................................. G06F 3/04895
USPC .................. 715/708, 765, 709, 710, 819, 829
See application file for complete search history.

(56) References Cited

U.S. PATENT DOCUMENTS

| | | | | |
|---|---|---|---|---|
| 5,434,965 | A * | 7/1995 | Matheny et al. ............... | 715/710 |
| 6,021,403 | A * | 2/2000 | Horvitz et al. .................. | 706/45 |
| 6,233,570 | B1 * | 5/2001 | Horvitz et al. .................. | 706/11 |
| 6,260,035 | B1 * | 7/2001 | Horvitz et al. .................. | 706/60 |
| 6,262,730 | B1 * | 7/2001 | Horvitz et al. ................. | 715/707 |
| 6,330,554 | B1 * | 12/2001 | Altschuler et al. ............. | 706/21 |
| 6,526,382 | B1 * | 2/2003 | Yuschik ........................ | 704/275 |
| 6,539,374 | B2 * | 3/2003 | Jung .................................... | 1/1 |
| 6,598,022 | B2 * | 7/2003 | Yuschik ........................ | 704/275 |
| 6,606,613 | B1 * | 8/2003 | Altschuler et al. ............... | 706/21 |
| 6,771,291 | B1 * | 8/2004 | DiStefano, III ................ | 715/762 |
| 6,778,971 | B1 * | 8/2004 | Altschuler et al. .............. | 706/55 |
| 6,941,266 | B1 * | 9/2005 | Gorin et al. .................... | 704/257 |
| 6,950,827 | B2 * | 9/2005 | Jung ..................................... | 1/1 |
| 7,080,321 | B2 * | 7/2006 | Aleksander et al. .......... | 715/708 |
| 7,127,677 | B2 * | 10/2006 | Chou ............................. | 715/741 |

(Continued)

FOREIGN PATENT DOCUMENTS

WO WO 2006050220 A2 * 5/2006 ............. H04L 12/28
WO WO 2006050220 A3 * 5/2007

OTHER PUBLICATIONS

Bing search q=context+sensitive+help&FORM=IE8SRC May 27, 2014.*
Bing search q=context+sensitive+help+threshold&q May 27, 2014.*

(Continued)

*Primary Examiner* — Boris Pesin
*Assistant Examiner* — John Heffington
(74) *Attorney, Agent, or Firm* — Osha Liang LLP (57) ABSTRACT

In general, in one aspect, the invention relates to a method for providing online support to a user of a client application. The method includes: initiating a wizard including dialogs for completing a task; displaying a dialog to the user; enabling, based on a network connection being available, a help threshold associated with the dialog; determining, by a computer processor, that the help threshold is exceeded after enabling the help threshold; sending, in response to the help threshold being exceeded, an availability request to an external support server; receiving, after sending the availability request, a confirmation of an available support specialist; displaying an indication to the user that support is available; receiving a support request from the user; opening a chat dialog in response to receiving the support request; and initiating, using the chat dialog, a chat session between the user and the available support specialist.

23 Claims, 6 Drawing Sheets

(56) References Cited

U.S. PATENT DOCUMENTS

| | | | | |
|---|---|---|---|---|
| 7,139,706 B2* | 11/2006 | Yuschik | | 704/243 |
| 7,146,531 B2* | 12/2006 | Sarra et al. | | 714/15 |
| 7,158,935 B1* | 1/2007 | Gorin et al. | | 704/257 |
| 7,269,656 B2* | 9/2007 | Chou et al. | | 709/229 |
| 7,382,773 B2* | 6/2008 | Schoeneberger et al. | | 370/353 |
| 7,475,815 B2* | 1/2009 | Sattler et al. | | 235/386 |
| 7,478,071 B2* | 1/2009 | Kadambe | | 705/500 |
| 7,480,064 B2* | 1/2009 | Katano | | 358/1.15 |
| 7,533,006 B2* | 5/2009 | Huddleston et al. | | 703/2 |
| 7,619,615 B1* | 11/2009 | Donoghue | | 345/169 |
| 7,676,035 B2* | 3/2010 | Werth et al. | | 379/266.09 |
| 7,694,311 B2* | 4/2010 | Amir et al. | | 719/320 |
| 7,707,499 B2* | 4/2010 | Zellner et al. | | 715/708 |
| 7,713,065 B2* | 5/2010 | Rogers et al. | | 434/322 |
| 7,743,415 B2* | 6/2010 | Poletto et al. | | 726/23 |
| 7,886,029 B2* | 2/2011 | Rogers et al. | | 709/220 |
| 7,904,297 B2* | 3/2011 | Mirkovic et al. | | 704/257 |
| 7,957,970 B1* | 6/2011 | Gorin et al. | | 704/257 |
| 7,996,259 B1* | 8/2011 | DiStefano, III | | 705/14.1 |
| 8,095,476 B2* | 1/2012 | Bierner et al. | | 705/500 |
| 8,128,415 B2* | 3/2012 | Rogers et al. | | 434/323 |
| 8,219,021 B2* | 7/2012 | Rogers et al. | | 434/350 |
| 8,365,077 B2* | 1/2013 | Sakakibara et al. | | 715/708 |
| 8,594,304 B2* | 11/2013 | Werth et al. | | 379/265.05 |
| 2001/0047261 A1* | 11/2001 | Kassan | | 704/270 |
| 2001/0054064 A1* | 12/2001 | Kannan | | 709/203 |
| 2002/0047859 A1* | 4/2002 | Szlam et al. | | 345/705 |
| 2002/0065912 A1* | 5/2002 | Catchpole et al. | | 709/224 |
| 2002/0087663 A1* | 7/2002 | Chou et al. | | 709/219 |
| 2002/0087914 A1* | 7/2002 | Sarra et al. | | 714/15 |
| 2002/0099796 A1* | 7/2002 | Chou | | 709/219 |
| 2002/0129004 A1* | 9/2002 | Bassett et al. | | 707/1 |
| 2002/0198722 A1* | 12/2002 | Yuschik | | 704/275 |
| 2003/0004719 A1* | 1/2003 | Yuschik | | 704/246 |
| 2003/0004730 A1* | 1/2003 | Yuschik | | 704/275 |
| 2003/0004731 A1* | 1/2003 | Yuschik | | 704/275 |
| 2003/0014421 A1* | 1/2003 | Jung | | 707/102 |
| 2003/0023534 A1* | 1/2003 | Kadambe | | 705/36 |
| 2003/0046086 A1* | 3/2003 | Yuschik | | 704/275 |
| 2003/0046088 A1* | 3/2003 | Yuschik | | 704/276 |
| 2003/0126151 A1* | 7/2003 | Jung | | 707/100 |
| 2004/0039775 A1* | 2/2004 | Yoshida et al. | | 709/203 |
| 2004/0098358 A1* | 5/2004 | Roediger | | 706/46 |
| 2004/0139156 A1* | 7/2004 | Matthews et al. | | 709/204 |
| 2004/0141508 A1* | 7/2004 | Schoeneberger et al. | | 370/401 |
| 2004/0201867 A1* | 10/2004 | Katano | | 358/1.15 |
| 2004/0215430 A1* | 10/2004 | Huddleston et al. | | 703/2 |
| 2005/0055216 A1* | 3/2005 | Bushey et al. | | 704/277 |
| 2005/0222915 A1* | 10/2005 | Wilson et al. | | 705/26 |
| 2005/0228796 A1* | 10/2005 | Jung | | 707/10 |
| 2005/0246639 A1* | 11/2005 | Zellner et al. | | 715/708 |
| 2006/0018441 A1* | 1/2006 | Timmins et al. | | 379/88.12 |
| 2006/0235953 A1* | 10/2006 | Meier | | 709/220 |
| 2006/0259272 A1* | 11/2006 | Sattler et al. | | 702/181 |
| 2007/0138268 A1* | 6/2007 | Tuchman | | 235/383 |
| 2007/0280462 A1* | 12/2007 | Neece | | 379/201.01 |
| 2008/0046561 A1* | 2/2008 | Pham et al. | | 709/224 |
| 2008/0096176 A1* | 4/2008 | Rogers et al. | | 434/350 |
| 2008/0096178 A1* | 4/2008 | Rogers et al. | | 434/362 |
| 2008/0096179 A1* | 4/2008 | Rogers et al. | | 434/362 |
| 2008/0096180 A1* | 4/2008 | Rogers et al. | | 434/362 |
| 2008/0096181 A1* | 4/2008 | Rogers et al. | | 434/362 |
| 2008/0102431 A1* | 5/2008 | Rogers et al. | | 434/350 |
| 2008/0102432 A1* | 5/2008 | Rogers et al. | | 434/350 |
| 2008/0102433 A1* | 5/2008 | Rogers et al. | | 434/350 |
| 2008/0102434 A1* | 5/2008 | Rogers et al. | | 434/350 |
| 2008/0102435 A1* | 5/2008 | Rogers et al. | | 434/350 |
| 2008/0102436 A1* | 5/2008 | Rogers et al. | | 434/362 |
| 2008/0102437 A1* | 5/2008 | Rogers et al. | | 434/362 |
| 2008/0104618 A1* | 5/2008 | Rogers et al. | | 719/328 |
| 2008/0108038 A1* | 5/2008 | Rogers et al. | | 434/350 |
| 2008/0108039 A1* | 5/2008 | Rogers et al. | | 434/350 |
| 2008/0108040 A1* | 5/2008 | Rogers et al. | | 434/362 |
| 2008/0133964 A1* | 6/2008 | Rogers et al. | | 714/4 |
| 2008/0215976 A1* | 9/2008 | Bierner et al. | | 715/708 |
| 2008/0244402 A1* | 10/2008 | Sakakibara et al. | | 715/708 |
| 2008/0254435 A1* | 10/2008 | Rogers et al. | | 434/362 |
| 2009/0018890 A1* | 1/2009 | Werth et al. | | 705/9 |
| 2009/0106645 A1* | 4/2009 | Knobel | | 715/236 |
| 2009/0125608 A1* | 5/2009 | Werth et al. | | 709/218 |
| 2009/0181640 A1* | 7/2009 | Jones | | 455/404.2 |
| 2009/0222507 A1* | 9/2009 | Koseki et al. | | 709/202 |
| 2009/0226873 A1* | 9/2009 | Rogers et al. | | 434/362 |
| 2009/0233264 A1* | 9/2009 | Rogers et al. | | 434/350 |
| 2010/0055659 A1* | 3/2010 | Rogers et al. | | 434/362 |
| 2010/0158236 A1* | 6/2010 | Chang et al. | | 379/265.03 |
| 2010/0180292 A1* | 7/2010 | Epstein et al. | | 725/32 |
| 2010/0269068 A1* | 10/2010 | Labrador | | 715/823 |
| 2010/0293560 A1* | 11/2010 | Bland et al. | | 719/328 |
| 2011/0064209 A1* | 3/2011 | Timmins et al. | | 379/201.01 |
| 2011/0075819 A1* | 3/2011 | Bruce et al. | | 379/88.04 |
| 2011/0078061 A1* | 3/2011 | Cai et al. | | 705/30 |
| 2011/0087511 A1* | 4/2011 | Werth et al. | | 705/7.14 |
| 2012/0079087 A1* | 3/2012 | Mukherjee et al. | | 709/223 |
| 2012/0166982 A1* | 6/2012 | Klein et al. | | 715/764 |
| 2012/0191629 A1* | 7/2012 | Shae et al. | | 706/11 |
| 2013/0297965 A1* | 11/2013 | Mensah | | 714/4.1 |

OTHER PUBLICATIONS

Bing search q=context+sensitive+help+threshold+c May 27, 2014.*

* cited by examiner

PROACTIVE CHAT SUPPORT

BACKGROUND

Most business and personal users depend heavily upon both client and web-based applications. For example, businesses are typically required to follow strict payroll laws and regulations. As a result, many businesses utilize payroll processing software in order to perform periodic payroll processing. Developers of such applications are required to keep pace with changing laws and regulations in order ensure that users are maintaining compliance. Developers may provide software updates to the users of a software application in order to implement changes to the application after release.

Many of the aforementioned software applications involve complex financial calculations and require a significant time investment by the user. Due to the sensitive nature of these calculations and the potential nuances of changing government requirements and regulations, users may require varying levels of support from software providers. The complexity and cost associated with providing such support can be significant, depending on the application and the user.

On the other hand, for software providers, support can be a leading source of revenue. Accordingly, it is in the interest of software providers to improve the efficiency of their support offering and to focus heavily on usability in their design. Thus, users of both client and web-based applications will be less likely to consume costly support resources. Innovations such as web-based chat have already contributed to increasing the efficiency of support resources for web-based applications. Conversely, client applications have had limited advancement in terms of support.

SUMMARY

In general, in one aspect, the invention relates to a method for providing online support to a user of a client application. The method includes: initiating a wizard including dialogs for completing a task; displaying a dialog of the dialogs to the user; determining that a network connection is available; enabling, based on the network connection being available, a help threshold associated with the dialog; determining, by a computer processor and based on a usage of the wizard by the user, that the help threshold is exceeded after enabling the help threshold, where exceeding the help threshold indicates that the user requires assistance in completing the task; sending, in response to the help threshold being exceeded, an availability request to an external support server; receiving, after sending the availability request, a confirmation of an available support specialist specializing in completing the task; displaying, in response to receiving the confirmation, an indication to the user that support is available; receiving, in response to displaying the indication, a support request from the user; opening a chat dialog in response to receiving the support request; and initiating, using the chat dialog, a chat session between the user and the available support specialist.

In general, in one aspect, the invention relates to a computer-readable storage medium storing instructions for providing online support to a user of a client application. The instructions include functionality to: initiate a wizard including dialogs for completing a task; display a dialog of the dialogs to the user; determine that a network connection is available; enable, based on the network connection being available, a help threshold associated with the dialog; determine, after enabling the help threshold and based on a usage of the wizard by the user, that the help threshold is exceeded, where exceeding the help threshold indicates that the user requires assistance in completing the task; send, in response to the help threshold being exceeded, an availability request to an external support server; receive, after sending the availability request, a confirmation of an available support specialist specializing in completing the task; display, in response to receiving the confirmation, an indication to the user that support is available; receive, in response to displaying the indication, a support request from the user; open a chat dialog in response to receiving the support request; and initiate, using the chat dialog, a chat session between the user and the available support specialist.

In general, in one aspect, the invention relates to a system for providing online support to a user. The system includes: a client computing device of a user having a processor; a client application executing on the processor and configured to: initiate a wizard including dialogs for completing a task; display a dialog of the dialogs to the user; a user support module of the client application, configured to: determine that a network connection is available; enable, based on the network connection being available, a help threshold associated with the dialog; determine, after enabling the help threshold and based on a usage of the wizard by the user, that the help threshold is exceeded, where exceeding the help threshold indicates that the user requires assistance in completing the task; send, in response to the help threshold being exceeded, an availability request to an external support server; receive, after sending the availability request, a confirmation of an available support specialist specializing in completing the task; display, in response to receiving a confirmation of an available support specialist, an indication to the user that support is available; receive, in response to displaying the indication, a support request from the user; open a chat dialog in response to receiving the support request; and initiate, using the chat dialog, a chat session between the user and the available support specialist.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for providing support to a user of a client application. In general, embodiments of the invention display one or more dialogs to a user. Based on the user's interaction with the dialog(s), a determination is made that the user requires assistance. In response to the determination, a chat session is initiated between the user and an available support specialist.

Figure 1:
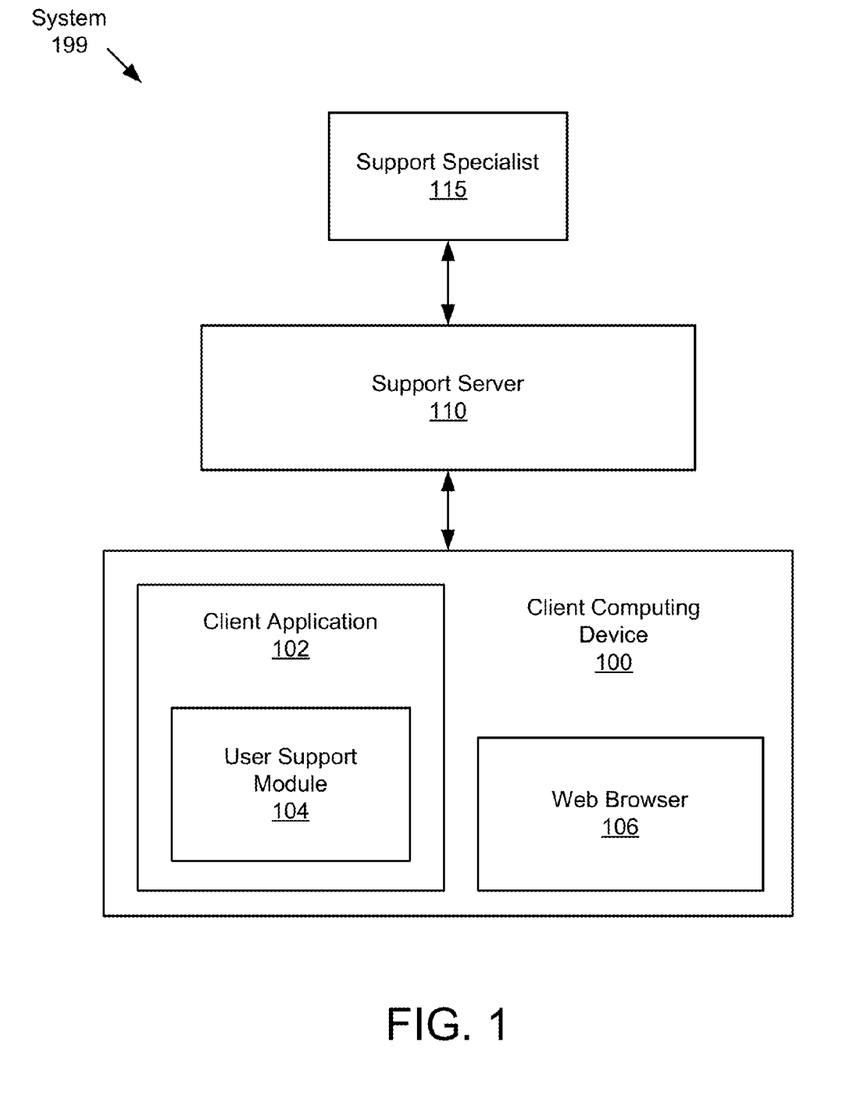
FIG. 1 shows a schematic diagram in accordance with one or more embodiments of the invention.

FIG. 1 shows a system (199) in accordance with one embodiment of the invention. As shown in FIG. 1, the system (199) has multiple components including a support server (110) and client computing device (100) having a client application (102) with a user support module (104) and a web browser (106). The system (199) may be communicatively connected to one or more support specialists (e.g., support specialist (115)). One or more components of the system (199) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. One or more of the components may also reside within other components. For example, the web browser (106) may reside within the client application (102). Those skilled in the art will appreciate that there may be more than one of each separate component running on a device, as well as any combination of these components within a given embodiment of the invention.

The client computing device (100) may be a personal computer (PC), a desktop computer, a laptop computer, a nettop computer, a netbook computer, a tablet computer, a handheld computer, a mobile internet device (MID), an ultra-mobile personal computer (UMPC), a personal digital assistant (PDA), a smartphone, and/or any other computing device capable of executing an application.

In one or more embodiments of the invention, the client application (102) is a software application executing on the client computing device. Examples of a software application may include, but are not limited to, a payroll application, a financial management application, a tax preparation application, a medical billing application, a travel and expense application, a web application displayed in a web browser, and/or any software application in accordance with various embodiments of the invention. The software application may be an interview-based application and/or a financial application (i.e., any application involving one or more financial amounts). An interview-based application may include one or more interviews designed to obtain information from a user of the application through a series of related dialogs. An interview may be any series of input requests associated with a common task, which are obtained from a user. Thus, the interview may include pages on a web site and/or dialogs displayed in a wizard.

In one or more embodiments of the invention, the client application (102) includes functionality to display a dialog to a user. The dialog may be a user interface window configured to obtain input from or display information to the user. The dialog may be a modal dialog or a modeless dialog or may be a component on a web page displayed in a web browser.

In one or more embodiments of the invention, the client application (102) includes functionality to display a wizard to a user. The wizard may be any series of dialogs displayed sequentially for the purpose of completing a task. Examples of a task may include, but are not limited to, setup of a business payroll account, completion of a tax form, entry of tax preparation information related to a tax topic (i.e., deductions, credits, personal income, business income, investments, education expenses, etc.), setup of an expense system, completion of a medical billing claim, completion of a payroll process for a pay period, and any task capable of being completed by a wizard.

In one or more embodiments of the invention, the user support module (104) includes functionality to identify a help threshold associated with a dialog. The help threshold may be an indication that the user requires assistance in completing the task. The help threshold may include any criteria for determining that the user requires help. For example, the help threshold may include a time interval associated with completion of a task, a change of focus between one or more fields, a change of focus between one or more dialogs, and/or a number of additions, deletions, and/or modifications of elements in one or more fields by the user. In one or more embodiments of the invention, a timer tracking the time interval is started upon opening of the wizard/page or upon detection of a predefined event (e.g., user entry into one or more fields, change of focus, etc.). The time may be stopped when a window of the client application (102) loses focus and may be restarted when the window regains focus.

In one or more embodiments of the invention, the user support module (104) includes functionality to determine whether a network connection (e.g., an internet connection) is available. The user support module (104) may be configured to poll for internet connectivity by performing a periodic check for internet access. In one or more embodiments of the invention, the user support module (104) disables proactive help functionality upon determining that internet connectivity is not available. The user support module (104) may be configured to enable proactive help functionality if it is determined that internet connectivity is available. Enabling proactive help functionality may include enabling one or more help thresholds.

In one or more embodiments of the invention, the user support module (104) includes functionality to determine that a help threshold is exceeded The help threshold may define any criteria or condition associated with the user support module (104) which must be met in order for the help threshold to be exceeded. In one or more embodiments of the invention, the user support module (104) is configured to enable the help threshold in response to determining that a network connection is available. Once the help threshold is enabled, the user support module (104) may begin analyzing the user's usage of the client application (102) or a portion thereof in order to determine whether the help threshold is exceeded. For example, a help threshold may define a time interval associated with a moving window of three dialogs in a wizard. The help threshold may be defined such that, if the user fails to complete any three sequential dialogs in the wizard within the time interval, the threshold is exceeded. In another example, a help threshold may be defined such that, if the user maintains continuous focus on a field within a dialog for a given time interval, the help threshold is exceeded.

In one or more embodiments of the invention, the help threshold specifies a change of focus in a wizard. For example, if a user shifts focus backwards (i.e., to a preceding dialog) more than once within a 20 second time interval, the user support module (104) may determine that a help threshold is exceeded. In one or more embodiments of the invention, the help threshold specifies one or more entries to a dialog and/or field. The user support module (104) may perform a comparison of the entries defined by the help threshold with one or more user entries to a field or dialog. Based on the comparison, the user support module (104) may determine that the help threshold is exceeded. For example, the user support module (104) may compare an amount in a dialog of a tax preparation application to a criterion defined by a help threshold. In this example, the criterion may be an improbable or unlikely number, such as any gross income amount greater than $1,000,000. In one or more embodiments of the invention, the help threshold criterion includes a mathematical formula for satisfying a condition defined by the help threshold. For example, the help threshold may require that a user's tax amount be greater than or equal to 10% of their adjusted gross income. In this example, the user support module (104) identifies a tax amount in a first field of a dialog and an adjusted gross income in a second field of the dialog. The user support module (104) then calculates the user's tax percentage as tax amount divided by gross income. The user support module (104) determines, based on the tax percentage being less than 10%, that the help threshold is exceeded.

In one or more embodiments of the invention, the help threshold specifies two or more related entries by a user. The help threshold may require that the entries be identical or similar (e.g., within a predefined numerical range, having a number of matching characters, etc.). In one or more embodiments of the invention, the user support module (104) is configured to determine that the help threshold is exceeded if the entries differ or if the difference between the entries exceeds a predefined range or criterion. For example, the user support module (104) may identify three gross income amount fields in a tax preparation application. In this example, the user support module (104) compares the gross income amounts based on a help threshold. The help threshold requires that the gross income amounts be within a range of plus or minus 10% year over year (YOY). In this example, the user support module (104) determines that the gross income amounts are $40,000 (2008), $42,000 (2009), and 48,000 (2010). The user support module (104) calculates the YOY difference between the gross income amounts based on the following formula: YOY=(Year2−Year1)/Year1. The user support module (104) calculates that the 2009 to 2010 growth was (48,000−42,000)/42,000=0.1428 or 14.28%. The user support module (104) determines that, because the YOY increase is greater than 10%, the help threshold is exceeded.

In one or more embodiments of the invention, the help threshold is based on a user request for help. The help threshold may include a number of help requests, a time interval spent browsing help, a help search string, help feedback from the user, one or more help topics, and/or any help related information. In one or more embodiments of the invention, the user support module (104) is configured to determine that the help threshold is exceeded if one or more of these criteria are met. For example, the user support module (104) may receive a help criterion specifying that, if a user requests help at least 2 times within any 5 minute time interval, the help criterion is exceeded. In another example, the user support module (104) may receive a help criterion defining a regular expression string. In this example, the user support module (104) evaluates the regular expression string against each search string entered by the user into a help utility of the client application (102). If the regular expression matches a user search string, the user support module (104) determines that the help threshold is exceeded. In yet another example, the help threshold may identify one or more help topics. In this example, the user support module (104) is configured to determine whether the user has accessed one or more help items associated with the help topics. If the user did access help topics matching the help topics, the user support module (104) determines that the help threshold is exceeded.

In one or more embodiments of the invention, the help threshold specifies one or more criteria for identifying errors. The user support module (104) may be configured to detect errors within a user's input. Examples of an error may include, but are not limited to, a negative number in a positive only field, a sum of percentages which exceeds one hundred percent, a missing entry in a required field, an invalid number which exceeds a predefined range (e.g., number of dependants in a tax return), a string entry which fails to match another string entry (based on a matching criterion), and/or any other user error in accordance with various embodiments of the invention.

In one or more embodiments of the invention, the user support module (104) includes functionality to send an availability request to the support server (110). The availability request may be a request to the support server for confirmation of an available support specialist. The request may be sent according to any protocol for communicating between programs and/or across a network. The availability request may include one or more client data items. Examples of client data items may include, but are not limited to a screenshot of the client application (102), a help topic accessed by the user, a task associated with a wizard or dialog being displayed, a sequence of accessed dialogs/fields, a help threshold which has been exceeded, user account information, and/or any other information associated with the user or the client application (102).

In one or more embodiments of the invention, the user support module (104) includes functionality to receive a confirmation of an available support specialist. The user support module (104) may be configured to receive confirmation of one or more available support specialists from the support server (110). Alternatively, the user support module (104) may be configured to receive the confirmation directly from a user through a user interface or from any other source (e.g., a third party software application). Support specialists may be able to log into a software application which then transmits availability information to the support server (110).

In one or more embodiments of the invention, the user support module (104) includes functionality to display an indication to the user that support is available. The indication may be any visible element displayed on a display screen of the client computing device (100). Examples of an indication may include, but are not limited to a tooltip, a popup window, a dialog box, a widget, a taskbar update, a message notification, a balloon tip, a system tray notification, and/or any other user interface element in accordance with various embodiments of the invention. The indication may include a message conveying that one or more support specialists are available. The message may include a name of an available support specialist, a number of specialists available, and/or a location of the support specialists. In one or more embodiments of the invention, the indication includes a user interface element capable of receiving input from the user (e.g., a hyperlink). Thus, the indication may include an invitation to the user to respond to the indication.

In one or more embodiments of the invention, the user support module (104) includes functionality to receive a support request from the user. The user support module (104) may be configured to receive the support request in response to the indication. Examples of a support request may include, but are not limited to selection of a hyperlink offering support, selection of a help key by a user, and/or any other method of requesting help in accordance with various embodiments of the invention.

Figure 5:
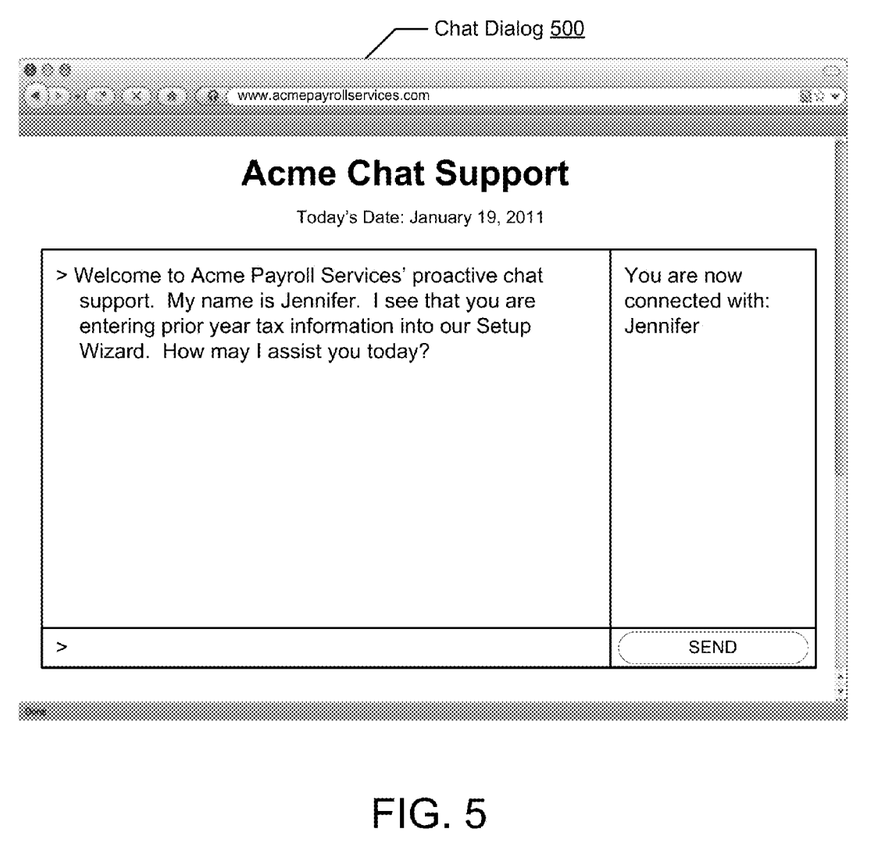
FIG. 5 shows a screenshot of a chat dialog in accordance with one or more embodiments of the invention.

In one or more embodiments of the invention, the user support module (104) includes functionality to open a chat dialog. The chat dialog may be a chat dialog box either (1) integrated within the client application (102) or (2) launched as an external window. For example, the chat dialog may be a window of the web browser (106) external to the client application (102). In another example, the web browser (106) may be utilized by the client application (102) to launch a browser window within the client application (102). In one or more embodiments of the invention, the chat dialog is an element displayed on a web page associated with the support server (110). The chat dialog may include a text area displaying real time conversation between the user and a support specialist. In one or more embodiments of the invention, the chat dialog includes functionality to enable remote desktop sharing and/or file transfer between the user and the support specialist. FIG. 5 is an example screenshot of a chat dialog.

In one or more embodiments of the invention, the user support module (104) includes functionality to initiate a chat session between the user and an available support specialist (115). The user support module (104) may open a secure communication channel between the client computing device (100) and a computing device used by the support specialist (115). The secure communication channel may utilize any protocol for transmitting electronic information and may encrypt information transmitted between the user and the support specialist, in accordance with various embodiments of the invention.

In one or more embodiments of the invention, the user support module (104) is configured to obtain feedback from the user regarding a chat session. The feedback may include a rating, a comment, a description, a transcription of the chat, a task which was discussed, an area of applicable payroll/tax/finance/etc. functionality of the client application (102), and/or any type of feedback from the user in accordance with various embodiments of the invention.

In one or more embodiments of the invention, the support server (110) is a software application or a series of related software applications executing on one or more hardware servers. The software application(s) may be a web application connected to a network and communicatively connected to the client application (102). The support server (110) may also be implemented as a non web based server application executing on a hardware server. In one or more embodiments of the invention, the support server (110) is a third party application accessed by the client computing device (100) using an application programming interface (API).

In one or more embodiments of the invention, the support server (110) includes functionality to receive availability requests. The support server (110) may receive availability requests from one or more user support modules associated with one or more client applications (e.g., client application (102)) and may be configured to allocate support specialists (e.g., support specialist (115)) to the user support modules based on one or more criteria. A criterion may be first in first out (FIFO), a priority assigned to high priority customers (e.g., those paying a support premium), a help topic identified by the user support module (104), a task identified by the user support module (104), a support specialty (i.e., area of expertise) of the support specialist (115), and/or any other criterion defined by the user support module (104) and/or the support server (110) in accordance with various embodiments of the invention. For example, the support server (110) may match a support specialist (115) to a user support module (104) based on a tax form identified by the user support module (104). In this example, the support server (110) is configured to identify a support specialist having an area of expertise which is related to the identified tax form (e.g., business deductions, limited liability partnerships, investment income, and/or real estate).

In one or more embodiments of the invention, the support server (110) includes functionality to send confirmation of one or more available support specialists to the user support module (104). The support server may be configured to notify the user support module (104) and/or the user of the client application using any means of sending messages in accordance with various embodiments of the invention (e.g., by send a text message to a mobile device of the user). The support server may send the confirmation after identifying an available support specialist. The confirmation may include a list of available support specialists from which the user may select. The confirmation may further include attributes of the support specialist(s) such as area of expertise, years of experience, certification(s), user feedback, and/or any attribute of the support specialist which may be useful to the user support module (104) and/or the user.

In one or more embodiments of the invention, the support server (110) includes a user interface. The user interface may be any form of interface configured to obtain input from one or more users (e.g., support specialists). In one or more embodiments of the invention, the user interface includes functionality to facilitate the chat session between the support specialist (115) and the user. The user interface may be a web application or a portion of a web application. The user interface may further include functionality to register support specialists, obtain availability information, pass messages or emails between the support specialist (115) and the user, facilitate the transfer of one or more files between the support specialist (115) and the user, and/or obtain any other relevant input from the support specialist (115).

In one or more embodiments of the invention, the support server (110) includes functionality to obtain support-related metadata from one or more client applications (client application (102)). Support-related metadata may include, but are not limited to, usage statistics, frequently accessed fields/help topics/pages/dialogs, help topics accessed, crash logs, screenshots, tax forms, payroll information, identifying information of the user, and/or any user input or related information in accordance with various embodiments of the invention. The support server (110) may be configured to link the support-related metadata to a support request and/or user account. Thus, in one or more embodiments of the invention, the support server (110) is configured to provide support-related metadata for one or more previous chat sessions to a support specialist.

In one or more embodiments of the invention, the user interface (not shown) is configured to receive definitions and/or modifications to one or more help thresholds. The user interface may obtain instructions from a user and/or software application to create, modify, and/or remove one or more help thresholds. Alternatively, the support server (110) may be configured to create, modify, and/or remove one or more help thresholds based on instructions obtained from a user or other entity. For example, the support server (110) may be configured to obtain a modification to a time interval associated with a field and/or dialog from an administrator of the support server (110).

Figure 2:
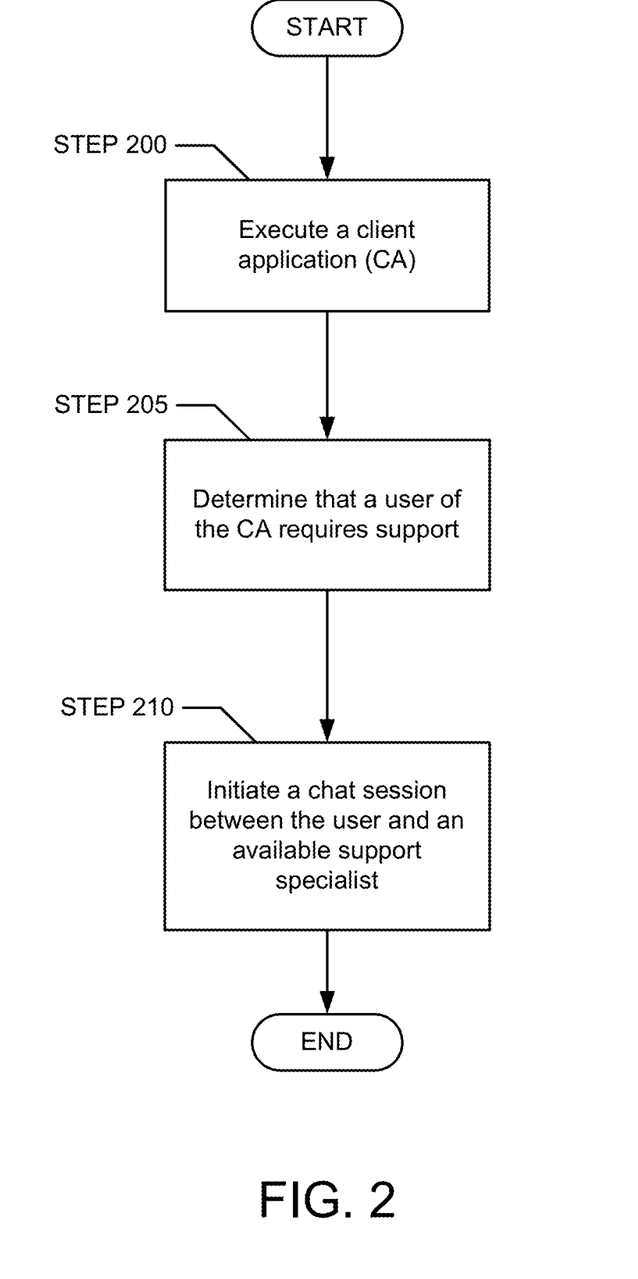
FIGS. 2 and 3 show flowcharts in accordance with one or more embodiments of the invention.

FIG. 2 shows a flowchart of a method for providing chat support to a user of a client application. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, a client application is executed. The client application may be executed on a client computing device and may be executed in response to a user request.

In STEP 205, it is determined that a user of the client application requires support. This determination may be made based on the user's usage of the client application and/or any number of criteria for detecting that the user requires assistance. In one or more embodiments of the invention, the client application is configured to determine that a help threshold is exceeded. The client application may monitor the user's usage and detect whether a help threshold is exceeded.

In STEP 210, a chat session is initiated between the user and an available support specialist. The chat session may be initiated after displaying an indication to the user that support is available.

Figure 3:
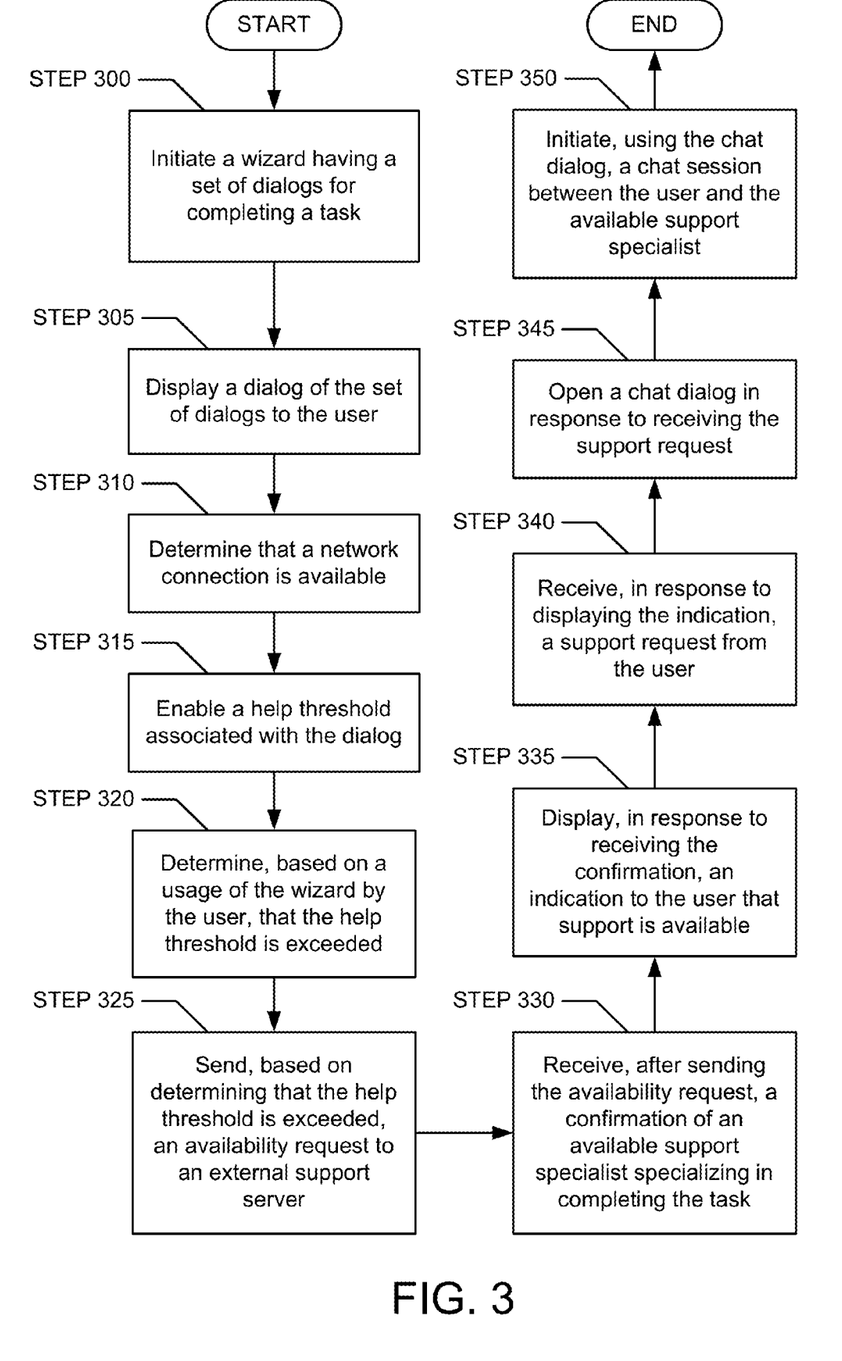

FIG. 3 shows a flowchart of a method for chat support to a user of a client application. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 3 should not be construed as limiting the scope of the invention.

In STEP 300, a wizard having a set of dialogs for completing a task is initiated. The wizard may be initiated in response to a user request and/or any event detected by the client application in accordance with various embodiments of the invention. The task may be any operation within the client application requiring input from the user. In one or more embodiments of the invention, each dialog of the set of dialogs is presented to the user in a predefined sequence. The dialogs may allow a user to move forward and/or backward in the sequence in order to enter data. In one embodiment of the invention, one or more dialogs of the set of dialogs are displayed to the user concurrently.

In STEP 305, a dialog of the set of dialogs is displayed to the user. The dialog may include any number of user interface elements designed to obtain input from and/or output information to the user. Once the dialog is displayed to the user, the user may enter data, request help, move forward or backward through the wizard, and/or complete or cancel the wizard.

In STEP 310, it is determined that a network connection is available. In one or more embodiments of the invention, the client application includes a process which periodically checks for internet connectivity. Upon identifying an active network connection, the client application may enable proactive chat support. If a network connection is not detected, chat support is not offered to the user.

In STEP 315, a help threshold associated with the dialog is enabled in response to the network connection being available. In one or more embodiments of the invention, enabling the help threshold consists of the general process of enabling proactive chat support in the client application. Alternatively, in one or more embodiments of the invention, individual help thresholds may be enabled, disabled, modified, and/or removed by a user of the client application or an external server configured to update the client application. In one or more embodiments of the invention, the help threshold is obtained from a support server or user prior to initiating the wizard. Help thresholds may be created, modified, and/or removed from the client application dynamically based on one or more periodic or event driven updates to the client application. The update(s) may be obtained from the support server or any other server capable of transmitting data to the client application.

In STEP 320, it is determined, based on a usage of the wizard by the user, that the help threshold is exceeded. Exceeding the help threshold may be interpreted as an indication that the user requires assistance in completing the task. Determining that the threshold is exceeded may include any number of actions by the client application. In one example, the client application may start one or more timers in order to determine whether a time interval defined by the help threshold is elapsed. In another example, the client application may perform a comparison of a user entered amount with a threshold amount defined by the help threshold.

In STEP 325, an availability request is sent to a support server based on determining that the help threshold is exceeded. The availability request may be any request designed to check whether one or more support specialists are available. The availability request may be sent to the support server by a background process and may be silent and invisible to the user of the client application.

In STEP 330, a confirmation of an available support specialist is received after sending the availability request. The confirmation of an available support specialist may be received by the client application in response to the availability request. In one or more embodiments of the invention, the confirmation is a message from the support server and may include support information in accordance with various embodiments of the invention. Upon receiving the confirmation, the support information may be displayed to the user using a user interface element associated with the dialog.

In STEP 335, an indication that support is available is displayed to the user in response to receiving the confirmation. In one or more embodiments of the invention, the indication is displayed to the user concurrently with the dialog. The indication may be configured to receive input from the user. Thus, the user may ignore or minimize the indication or continue using the dialog, in accordance with various embodiments of the invention.

In STEP 340, a support request is received from the user in response to displaying the indication. The support request may be a selection of a user interface element within the indication. In one or more embodiments of the invention, the user enters additional information in response to the indication. For example, the user may enter a message to be shown to the support specialist, a help topic, a help question, and/or any other support-related information. In another example, the user selects a specific support specialist based on a price, expertise, experience, and/or other criteria displayed with the indication.

In STEP 345, a chat dialog is opened in response to receiving the support request. The chat dialog may be a modal or modeless dialog and may be displayed with the dialog or outside of the client application.

In STEP 350, a chat session between the user and the available support specialist is initiated using the chat dialog. In one or more embodiments of the invention, the chat session includes an optional video/audio element and/or a file transfer tool capable of sending support-related information to the support specialist. The user may initiate file transfer, accept remote desktop functionality, and/or send information in real time.

The following section describes various examples of the invention. The examples are included to aid in the understanding of the invention but are not intended to limit the scope of the invention. In one example, a user executes a client payroll application on a desktop computer. The user initiates a wizard having 20 dialogs in order to setup a new payroll account for a small business. Upon launching the wizard, the client payroll application identifies two help thresholds associated with the wizard. The client payroll application determines that a network connection is available and, as a result, enables the two help thresholds. In this example, the wizard displays a first dialog requesting basic information about the business (e.g., address, phone number, number of employees, etc.). The user then enters tax information into the next two dialogs of the wizard.

Figure 4:
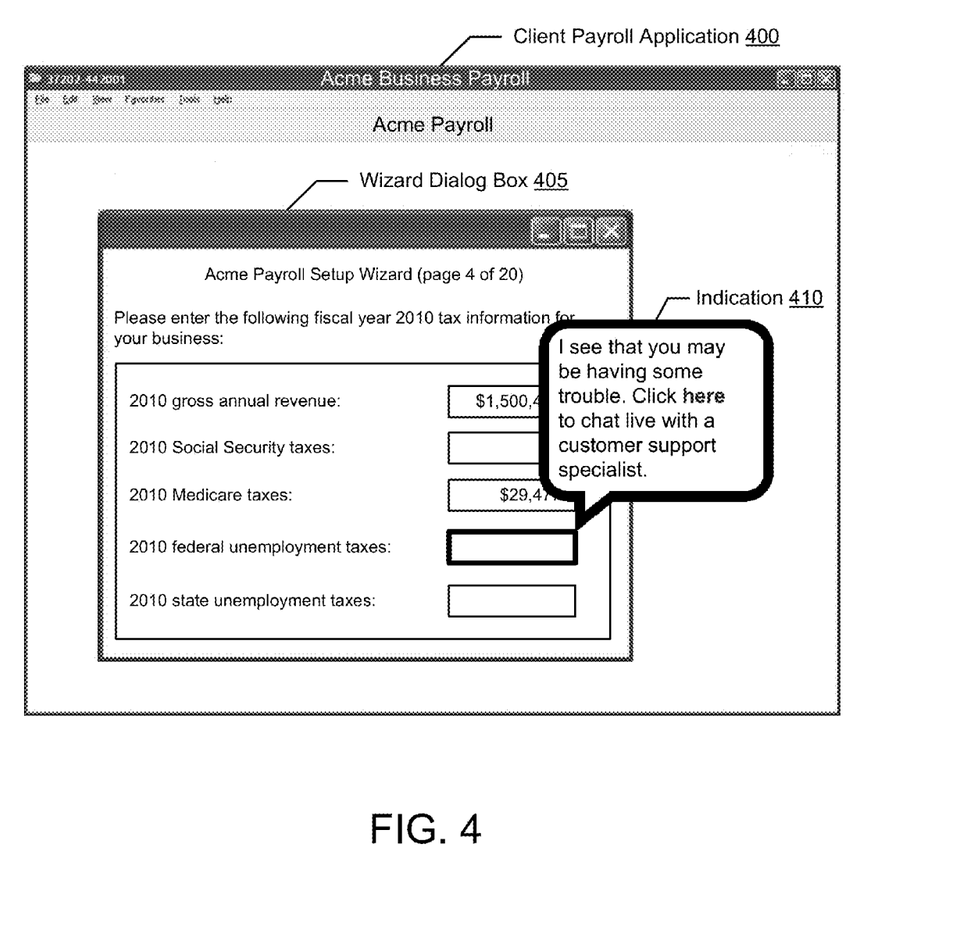
FIG. 4 shows a screenshot of a client payroll application in accordance with one or more embodiments of the invention.

Continuing the example, FIG. 4 depicts an example screenshot of the client payroll application (400). As shown in the figure, the user tabs through a series of fields on the fourth dialog (wizard dialog box (405)) of the wizard. The user skips the second field ("2010 Social Security taxes") and enters data into the third field. Next the user pauses for 60 seconds on the fourth field of the dialog ("2010 federal unemployment taxes"). Meanwhile, a first help threshold of the two identified help thresholds is identified as being associated with the dialog. This help threshold includes a criterion defined such that, it is tracked whether the user skips any fields in the dialog (i.e., enters data in a subsequent field without entering data in the skipped field). If the user skips any such fields and also pauses for 60 seconds or more on a subsequent field, the client payroll application determines that the help threshold is exceeded.

In this example, upon determining that the help threshold is exceeded, the client financial application sends an availability request to an external support server. The support server, upon receiving the request, identifies ten available support specialists connected by a series of support machines. The support server then determines that five of the ten available support specialists specialize in the client payroll application. In response to identifying the five available support specialists, the support server sends a confirmation of an available support specialist to the client payroll application.

Continuing the example, the client payroll application receives the confirmation and displays an indication (410) to the user that support is available. As shown in FIG. 4, the indication (410) is a tooltip including a message to the user and a hyperlink for receiving the support request. In this example, the user clicks the hyperlink in order to request assistance. The client payroll application then randomly selects a support specialist of the five available support specialists and opens a chat dialog between the user and the selected support specialist.

Continuing the example, FIG. 5 depicts an example screenshot of the chat dialog (500). After initiating the chat session, the client payroll application sends all information inputted into the wizard, along with a definition of the exceeded help threshold to the support specialist. The support specialist then provides real-time support to the user based on the provided information.

Figure 6:
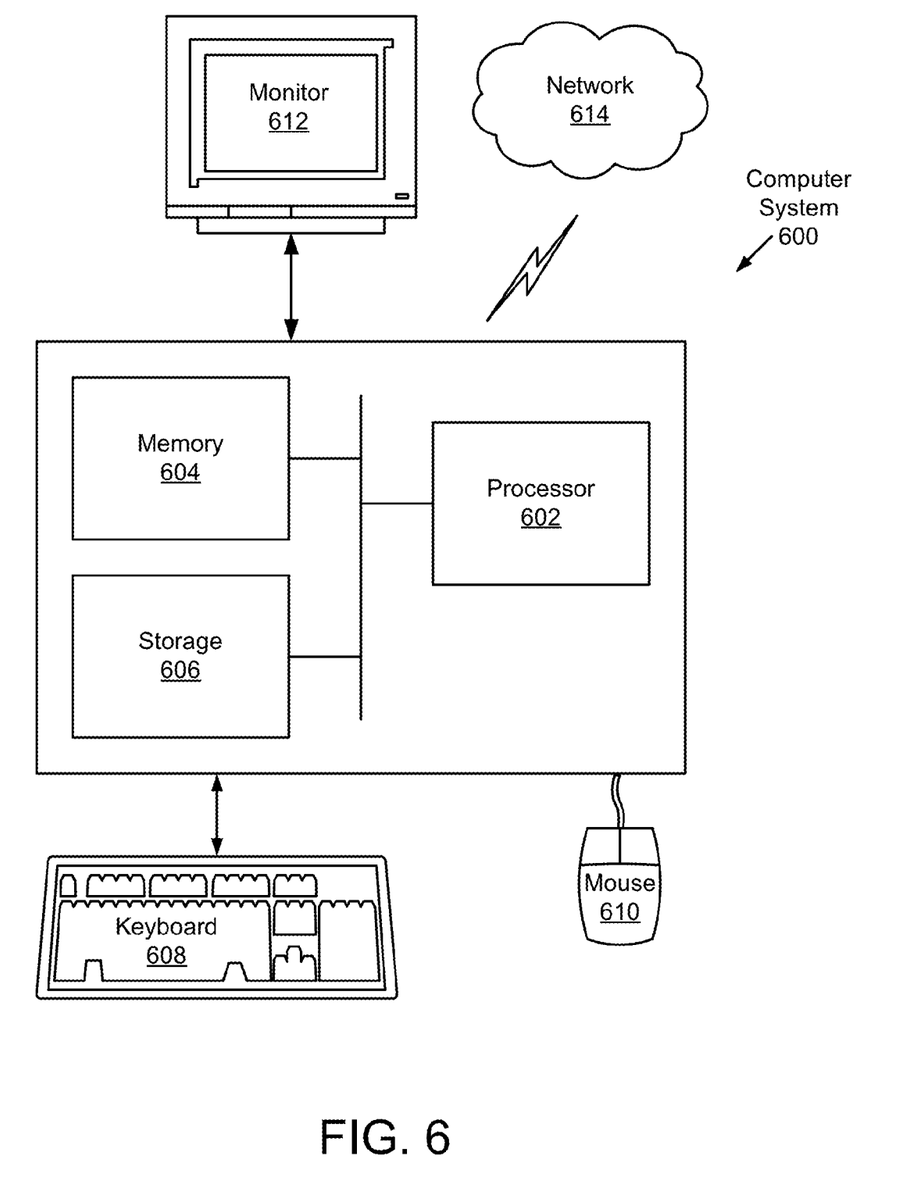
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, hardware processor, etc.), associated memory (604) (e.g., RAM, cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., support server (110), client application (102), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By providing proactive chat support to a user of a client application, users may be assisted more quickly and efficiently. The client application may, by detecting when a network connection is available, be able to determine when a user requires assistance and provide such assistance in real time.

In one or more embodiments of the invention, users may be undisturbed when help is unavailable. Thus, users may work actively on the problem themselves until such time as help is available. In some instances, the user may even solve their own issue via other avenues (e.g., help topics) while waiting for assistance from a support specialist.

In one or more embodiments of the invention, user abandonment may be reduced or eliminated as there may be little or no wait time for chatting with a support specialist. Since abandonment may correlate with low user satisfaction, overall user satisfaction may also be improved.

In one or more embodiments of the invention, the average length of support sessions may be reduced as users no longer take time to complain about long wait times. Also, users may be less likely to ask unrelated or hypothetical help questions before letting the support specialist go for fear of a long wait if the problem recurs.

In one or more embodiments of the invention, support specialists may be moved to higher priorities temporarily without substantially affecting the user experience. In this scenario, users with lower priority issues may simply not be offered a chat session. This may provide a significant cost savings.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing online support to a user of a client application executing on a client computing device, comprising:
  initiating a client application wizard on the client computing device comprising a plurality of dialogs for completing a task;
  displaying a dialog of the plurality of dialogs to the user of the client application, wherein the client application is one selected from a group consisting of a tax preparation application, a payroll application, and a financial management application;
  determining by a user support module of the client application that a network connection is available on the client computing device;
  enabling by the user support module of the client application, after determining that the network connection is available on the client computing device, a help threshold associated with the dialog and comprising a help threshold percentage;
  calculating, by the user support module of the client application, a result based on a dollar amount in a first field of the client application wizard populated by the user;
  determining, by the user support module executing on a computer processor of the client computing device, and based on a comparison of the result and the help threshold percentage, that the help threshold is exceeded after enabling the help threshold, wherein exceeding the help threshold indicates that the user of the client application requires assistance in completing the task;
  sending via the network connection of the client computing device, in response to the help threshold being exceeded, an availability request to an external support server;
  receiving via the network connection of the client computing device, after sending the availability request, a confirmation of an available support specialist specializing in completing the task;
  displaying, in response to receiving the confirmation, an indication to the user of the client application that the support specialist is available over the network connection;
  receiving, in response to displaying the indication to the user of the client application, a support request from the user of the client application;
  opening a chat dialog over the network connection of the client computing device in response to receiving the support request from the user of the client application; and
  initiating, using the chat dialog, a chat session over the network connection of the client computing device between the user and the available support specialist.

2. The method of claim 1, further comprising:
  setting focus to the first field in the dialog, wherein the help threshold further comprises a time interval corresponding to the first field, and wherein determining that the help threshold is exceeded further comprises determining that the time interval is elapsed.

3. The method of claim 2, further comprising:
  starting a timer in response to setting focus to the first field, wherein determining that the time interval is elapsed is based on the timer;
  detecting, prior to determining that the time interval is elapsed, that an application window of the client application has lost focus;
  pausing the timer in response to detecting that the application window has lost focus;
  detecting, after pausing the timer, that the application window has regained focus; and
  restarting the timer in response to detecting that the application window has regained focus.

4. The method of claim 2, wherein the first field maintains focus during the first time interval.

5. The method of claim 2, further comprising:
  entering by the user, prior to setting focus to the first field, a value into a second field in the dialog; and
  adjusting the time interval based on the value.

6. The method of claim 2, further comprising:
  obtaining, prior to setting focus to the first field, the time interval from the external support server; and
  storing the time interval in a file system storing the client application.

7. The method of claim 1, wherein determining that the help threshold is exceeded comprises:
  detecting, in a predefined order, a shift of focus between a plurality of fields in the dialog, wherein determining that the help threshold is exceeded further comprises detecting the shift of focus.

8. The method of claim 1, further comprising:
  displaying a preceding dialog of the plurality of dialogs to the user;
  identifying a time interval associated with the preceding dialog; and
  determining, prior to displaying the dialog, that the time interval is elapsed, wherein the preceding dialog remains open during the time interval, and wherein determining that the help threshold is exceeded further comprises determining that the time interval is elapsed.

9. The method of claim 1, further comprising:
  receiving the help threshold from the external support server; and
  receiving, after initiating the chat session, an update to the help threshold.

10. The method of claim 1, further comprising:
  obtaining a plurality of support-related metadata from a plurality of client applications comprising the client application, wherein the plurality of support-related metadata corresponds to support requests received from the client applications;
  identifying a common trend based on the plurality of support-related metadata; and
  defining a new help threshold based on the common trend.

11. The method of claim 1, further comprising:
  uploading a screenshot of the client application to the external support server, wherein the screenshot is sent to the available support specialist.

12. The method of claim 1, wherein the chat dialog is a web browser window external to the client application.

13. The method of claim 1, wherein the chat dialog is within the client application.

14. A non-transitory computer-readable storage medium storing a plurality of instructions for providing online support to a user of a client application executing on a client computing device, the plurality of instructions comprising functionality to:
  initiate a client application wizard on the client computing device comprising a plurality of dialogs for completing a task;
  display a dialog of the plurality of dialogs to the user of the client application, wherein the client application is one selected from a group consisting of a tax preparation application, a payroll application, and a financial management application;

determine by a user support module of the client application that a network connection is available on the client computing device;

enable by the user support module of the client application, after determining that the network connection is available on the client computing device, a help threshold associated with the dialog and comprising a help threshold percentage;

calculate, by the user support module of the client application, a result based on a dollar amount in a first field of the client application wizard populated by the user;

determine by the user support module executing on a computer processor of the client computing device, after enabling the help threshold and based on a comparison of the result and the help threshold percentage, that the help threshold is exceeded, wherein exceeding the help threshold indicates that the user of the client application requires assistance in completing the task;

send via the network connection of the client computing device, in response to the help threshold being exceeded, an availability request to an external support server;

receive via the network connection of the computing device, after sending the availability request, a confirmation of an available support specialist specializing in completing the task;

display, in response to receiving the confirmation, an indication to the user of the client computing device that the support specialist is available over the network connection;

receive, in response to displaying the indication to the user of the client application, a support request from the user of the client application;

open a chat dialog over the network connection of the client computing device in response to receiving the support request from the user of the client application; and initiate, using the chat dialog, a chat session over the network connection of the client computing device between the user and the available support specialist.

15. The non-transitory computer-readable storage medium of claim 14, wherein the plurality of instructions further comprise functionality to:

set focus to the first field in the dialog, wherein the help threshold further comprises a time interval corresponding to the first field, and wherein determining that the help threshold is exceeded further comprises determining that the time interval is elapsed.

16. The non-transitory computer-readable storage medium of claim 15, wherein the plurality of instructions further comprise functionality to:

enter, prior to setting focus to the first field, a value into a second field in the dialog; and adjust the time interval based on the value.

17. The non-transitory computer-readable storage medium of claim 14, wherein determining that the help threshold is exceeded further comprises:

detecting, in a predefined order, a shift of focus between a plurality of fields in the dialog, wherein determining that the help threshold is exceeded further comprises detecting the shift of focus.

18. The non-transitory computer-readable storage medium of claim 14, wherein the plurality of instructions further comprise functionality to:

display a preceding dialog of the plurality of dialogs to the user;

identify a time interval associated with the preceding dialog; and determine, prior to displaying the dialog, that the time interval is elapsed, wherein the preceding dialog remains open during the time interval, and wherein determining that the help threshold is exceeded further comprises determining that the time interval is elapsed.

19. The non-transitory computer-readable storage medium of claim 14, wherein the plurality of instructions further comprise functionality to:

receive, after initiating the chat session, an update to the help threshold.

20. The non-transitory computer-readable storage medium of claim 14, wherein the plurality of instructions further comprise functionality to:

obtain a plurality of support-related metadata from a plurality of client applications comprising the client application, wherein the plurality of support-related metadata corresponds to support requests received from the client applications;

identify a common trend based on the plurality of support-related metadata; and define a new help threshold based on the common trend.

21. The non-transitory computer-readable storage medium of claim 14, wherein the plurality of instructions further comprise functionality to:

upload a screenshot of the client application to the external support server, wherein the screenshot is sent to the available support specialist.

22. A system for providing online support to a user, comprising:

a client computing device of a user comprising a processor;

a client application executing on the processor and configured to:

initiate a client application wizard on the client computing device comprising a plurality of dialogs for completing a task; and display a dialog of the plurality of dialogs to the user of the client application, wherein the client application is one selected from a group consisting of a tax preparation application, a payroll application, and a financial management application; and a user support module of the client application, configured to:

determine that a network connection is available on the client computing device;

enable, after determining that the network connection being available on the client computing device, a help threshold associated with the dialog and comprising a help threshold percentage;

calculate, by the user support module of the client application, a result based on a dollar amount in a field of the client application wizard populated by the user;

determine, after enabling the help threshold and based on a comparison of the result and the help threshold percentage, that the help threshold is exceeded, wherein exceeding the help threshold indicates that the user of the client application requires assistance in completing the task;

send via the network connection of the client computing device, in response to the help threshold being exceeded, an availability request to an external support server;

receive via the network connection of the client computing device, after sending the availability request, a confirmation of an available support specialist specializing in completing the task;

display, in response to receiving a confirmation of an available support specialist, an indication to the user of the client application that the support specialist is available over the network connection;

receive, in response to displaying the indication to the user of the client application, a support request from the user of the client application;

open a chat dialog over the network connection of the client computing device in response to receiving the support request from the user of the client application; and initiate, using the chat dialog, a chat session over the network connection of the client computing device between the user and the available support specialist.

23. The system of claim 22, further comprising:

an external support server configured to:

send, in response to the availability request, the confirmation of the available support specialist to the user support module.

* * * * *